(12) United States Patent
Foltuz et al.

(10) Patent No.: US 6,196,824 B1
(45) Date of Patent: Mar. 6, 2001

(54) CENTER GATING INJECTION MOLDING APPARATUS WITH REMOVABLE HETERO-MOLDING TOOLS

(75) Inventors: Eugene L. Foltuz; Norman H. Cohan; Enidio A. Gomez, all of Miami Lakes, FL (US)

(73) Assignee: Security Plastics, Inc., Miami, FL (US)

( * ) Notice: Subject to any disclaimer, the term of this patent is extended or adjusted under 35 U.S.C. 154(b) by 0 days.

(21) Appl. No.: 09/224,264

(22) Filed: Dec. 31, 1998

(51) Int. Cl.[7] ................................................ B29C 45/40
(52) U.S. Cl. ..................... 425/190; 425/192 R; 425/547; 425/556
(58) Field of Search ................................. 425/547, 552, 425/556, 185, 190, 192 R

(56) References Cited

U.S. PATENT DOCUMENTS

| | | |
|---|---|---|
| 3,871,611 | 3/1975 | Taketa . |
| 4,828,479 | 5/1989 | Pleasant . |
| 4,959,002 | 9/1990 | Pleasant . |
| 5,324,191 | 6/1994 | Schmidt . |
| 5,798,069 | 8/1998 | Bertschi et al. . |

Primary Examiner—Tim Heitbrink
(74) Attorney, Agent, or Firm—Lott & Friedland, PA

(57) ABSTRACT

An injection molding apparatus having an A side and a B side for use with interchangeable molding tools that allow the center gating of a part. Center gating directly into a molding tool provides a uniformly stress resistant cylindrical part. The use of interchangeable molding tools provides easy replacement of tools that are designed to produce a variety of different parts. Each interchangeable molding tool provides a runner tool distribution system to allow injected material to enter directly into the center of a part to be molded. Once the part is molded, the runner that is formed in the runner tool distribution system is separated from the molded part. The molded parts are then simultaneously released from the mold assembly.

1 Claim, 4 Drawing Sheets

CENTER GATING INJECTION MOLDING APPARATUS WITH REMOVABLE HETERO-MOLDING TOOLS

CROSS REFERENCE

The present application is related to the following copending application, filed herewith on Dec. 23, 1998, entitled: "Water Jacket Apparatus For Injection Molding Systems," and assigned Application Ser. No. 09/224,263.

FIELD OF THE INVENTION

The present invention relates generally to injection molding and more particularly, to improvements in an injection molding press apparatus with removable and interchangeable molding tools.

BACKGROUND OF THE INVENTION

Injection molding techniques have for some time been used for molding various parts, particularly of plastic. The injection molding apparatus conventionally consists of a mold formed of two halves typically, one or more pairs of fixed and movable bases (also referred to A and B mold bases respectively), which are mounted, respectively, on the top clamp plate and base support plate of the injection mold base mounted on the molding machine. Mold inserts, plural A and B mold inserts, which are adapted to fit into the fixed and movable sides of the machine usually have mold cavity defining means which are fixed in the bases in paired alignment, whereby upon closure of the base support plate toward the top clamp plate respective pairs of oppositely disposed mold inserts are brought together to close the mold cavities. Molding material is fed through the top clamp plate and A mold base thereon to a runner distribution system in the two mold sides, and molding material is delivered from such distribution system to respective mold cavities to mold parts. An ejector apparatus usually is provided to eject the molded parts from the opened mold cavities and the excess mold or runner from the runner distribution system by means of ejector pins that extend, for example, through the base support plate, B mold base and B mold inserts mounted thereon.

Moreover, molds with removable mold inserts for mold frames are in use and are especially valuable for prototype or low production molding needs wherein the tooling is changed after relatively short time. However, the known molds of this type only allow for molding of several like-parts and do not allow for the molding of different parts. In order to mold a different part, the entire mold assembly must be changed. Because only the same mold inserts can be used at the same time, the molding of different parts still requires substantial changeover time. The need exists for an inexpensive and efficient mold injection apparatus, which molds different parts at the same time and requires only minimal changeover time and machining operations.

Another concern in the injection molding industry is the method of gating into a part. Weld lines are places where multiple flow fronts in injection molding meet. These regions are not usually as strong as the rest of the part. Since they can introduce weakness into the part, reducing weld lines in injection molding remains a primary concern. The following methods exist to minimize the effect of weld lines: (1) locate weld lines closer to a gate to make them strong; (2) provide venting at the weld line; (3) increase part thickness at the weld line; (4) increase melt temperature; and (5) increase injection pressure and speed.

In addition to the foregoing, center gating, which is used to mold round or cylindrical parts, reduces the well lines formed when molding a circular part rather than edge gating or gating through the main parting line of a mold assembly. The uniform flow of an injection molding material from the center of a round part radially outwards produces a stronger part, as the molding material is uniformly molded from the center and then radially outwards. Because geometry of a desired part dictates how it should be gated, circular parts that require the ability to withstand an equal stress distribution around the center of the circular part are best molded if the molding material enters through to the center of the part, and molds radially outwards from the center of the part. This is accomplished by center gating directly into a mold insert. The need also exists for a mold injection apparatus with removable mold inserts, which allow center gating directly into the mold insert.

Previous attempts to provide an injection molding apparatus containing removably interchangeable molding tools or removable and interchangeable mold inserts are described in U.S. Pat. No. 3,871,611 to Taketa ('611 patent); U.S. Pat. No. 4,828,479 to Pleasant ('479 patent); and U.S. Pat. No. 4,959,002 to Pleasant ('022 patent); all of which are incorporated herein by reference. In addition, previous attempts to provide different gating techniques are described in U.S. Pat. No. 5,798,069 to Bertschi et al. ('069 patent) and 5,324,191 to Schmidt ('191 patent), both of which are also incorporated herein by reference.

The '611 patent describes an improved mold having removable and replaceable cores (mold inserts or molding tools) and cavities, so that the need of providing a new mold base for every new part or product is eliminated. The arrangement of the mold is such that the cores and cavities can be easily and quickly removed and replaced with minimum down time of the molding apparatus.

The '479 patent describes a molding apparatus for use with removable inserts, described in patent '002. The molding apparatus comprises a cavity insert for the injection side and a core insert for the ejection side of a mold which are each shaped as a generally cylindrical, stepped body provided with circumferentially extending locking grooves and a liquid cooling or heating channel. Insert retainers and lifters having rotatable elements with locking tongues engaging the locking grooves clamp the inserts in the main mold frame. The main mold frame is provided with liquid conduits opening to opposite ends of the liquid channels so that the need for machine liquid conduits and channels for different inserts is avoided. Ejector tooling may be connected to the core insert for insertion and removal with it.

The '069 patent describes an opposed gating injection method and apparatus for forming molded articles from a composite of materials with injection molders having a first mold half and a second mold half adapted to cooperate to form at least one mold cavity. A first injection means is positioned in the first mold half adjacent the one cavity for injecting a first molding resin onto the mold cavity through a first orifice. A second injection means is included which is positioned in the second mold half adjacent the mold cavity for injecting a second molding resin.

The '191 patent describes an improved sealed edge gate arrangement for use in an injection molding machine which comprises a nozzle assembly having a tip end and at least one melt channel extending into the tip end and an annular seal or sealing ring snuggly fit over the tip end of the nozzle assembly. The seal ring has at least one melt channel for mating with the at least one melt channel in the nozzle assembly.

None of the devices mentioned above comprise an injection molding apparatus which simultaneously molds different components while allowing the easy replacement of each different mold insert. The '611 patent describes removable mold inserts and a mold assembly which only allows for the simultaneous molding of like components. Similarly, the '479 patent describes a molding apparatus which allows for removable inserts but does not allow for the simultaneous molding of different components.

Moreover, none of the devices mentioned above employ a removable mold insert, which allows gating directly into the mold insert, in conjunction with the simultaneous molding of a plurality of different parts. Both the '069 and '191 patent provide an improved apparatus for the use of improved gating methods but neither patent provides for an injection molding apparatus with removable mold inserts or molding tools which can simultaneously mold a plurality of different parts and which removable inserts provide for center gating.

The above inventions only allow for the use of a uniform set of removable mold inserts. Variation of the parts to be molded requires changing the entire mold assembly. Simultaneous molding of different components can only be achieved by using two separate molding apparatuses, one mold assembly containing a particular uniform set of mold inserts and another mold assembly containing another particular set of uniform of mold inserts.

Consequently, there is a need in the art for a molding press injection apparatus with removable inserts or molding tools, that allows the simultaneous molding of different parts.

There is a further need in the art for an injection molding apparatus, which quickly molds the different parts.

Finally, there is a further need in the art for a molding press injection apparatus with removable inserts which provides center gating directly into each removable mold insert.

SUMMARY OF THE INVENTION

The above and other needs in the art are fulfilled by the provision of an injection molding apparatus comprising a mold assembly comprising an A side and a B side namely, a fixed side having a fixed molding surface and an ejector side having an ejector molding surface, respectively, wherein the molding surfaces when pressed together form a plurality of mold cavities, a plurality of interchangeable molding tools which are releasably attached to the mold assembly, a plurality of runner tool distribution systems which form a plurality of which form a plurality of runners once the molding material has set, a securing means for releasably securing the interchangeable molding tools to the mold assembly, a means for injecting a molding material directly into each interchangeable molding tool for forming a plurality of different components, a cooling means for effectively cooling the components once the molding material has set, a stripping means for separating each runner from each molded component, a first removal means for removing the runners from the mold assembly, a releasing means for releasing the plurality of different components from the mold assembly once the molding material has set, and a second removal means for removing the different components from the mold assembly once the different components are released from the mold assembly.

The interchangeable molding tools each comprise a fixed tool side and an ejector tool side. The fixed tool side of each interchangeable molding tool comprises a runner tool distribution system. Each molding tool is custom-designed for the molding of a particular shaped component.

The securing means for securing the plurality of interchangeable molding tools to the mold assembly comprises a plurality of fixed locking keys and a plurality of ejector rotating locking keys. The locking means for locking the mold assembly together when the molding surfaces are pressed together comprises a locking key apparatus. The cooling means for cooling the different components once the material has been injected into the mold cavities comprises a water jacket apparatus for injection molding systems. The stripping means separates the runners formed in the runner distribution system from the molded components once the molding material has set and comprises a stripper plate. The releasing means for simultaneously releasing the different components from the mold assembly once the molding material has set comprises an ejection assembly.

An object of this invention is to provide an injection molding apparatus with removable and interchangeable molding tools, which can simultaneously mold a variety of different components.

Another object of this invention is to provide an injection molding apparatus, which allows the quick and efficient simultaneous molding of different components avoiding the necessary change over time for the replacement of interchangeable molding tools for the molding of different components.

Another object of this invention is to provide an injection molding apparatus with interchangeable and removable molding tools, which provide gating directly into each interchangeable molding tool.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate preferred and exemplary embodiments, and wherein.

DESCRIPTION OF THE PREFERRED EMBODIMENTS

Figure 1:
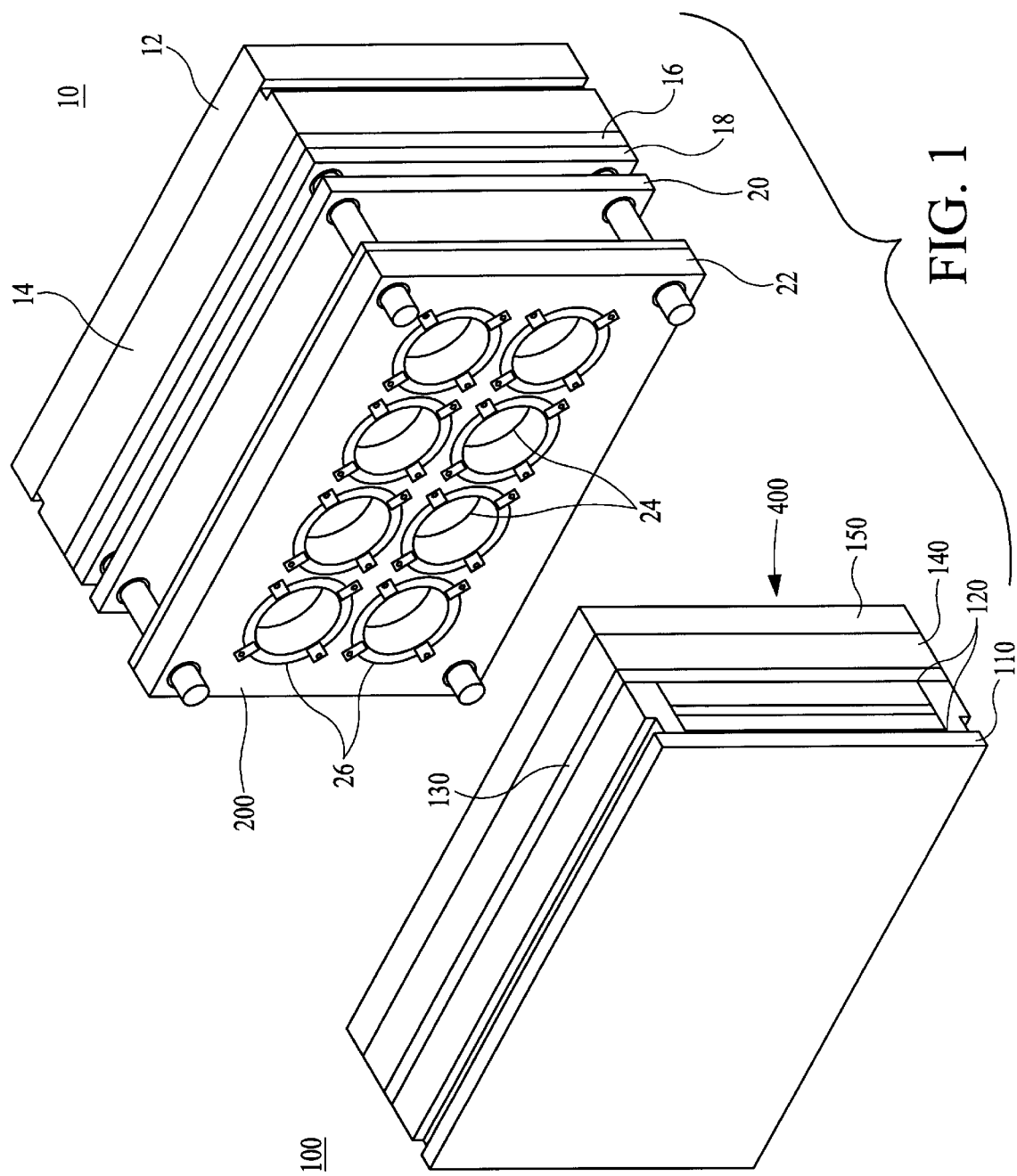
FIG. 1 is a perspective view of each side of the mold assembly, in an open position, a fixed side and an ejector side, in accordance with the present invention.

Referring now to the drawings, FIG. 1 illustrates a perspective view of both sides of the molding press apparatus, a fixed side having a fixed molding surface 200, designated generally at 10 and an ejector side having an ejector molding surface 400 designated generally at 100, respectively, which are both made in accordance with the present invention. Both sides, 10, 100 when pressed together form a mold assembly comprising a plurality of mold cavities. The molding press apparatus has a plurality of interchangeable molding tools 300 (shown in FIG. 4) which are substantially releaseably affixed to the mold assembly for molding a plurality of different components, a securing means for securing the interchangeable molding tools to the mold assembly (shown in FIGS. 2 and 3), a locking means for locking the mold assembly together when both molding surfaces 10, 100 are pressed together to form the plurality of mold cavities, a means for injecting a molding material directly into the interchangeable molding tools for forming the plurality of different components, a cooling means for cooling the different components once the molding material has been injected into the mold assembly, a runner tool distribution system which forms a runner once the molding material has set, a stripping means for separating the runners from the different components, a first removal means for removing the runners from the mold assembly, a releasing means for releasing the plurality of different components once the molding material has set and a second removal means for removing the different components once the different components have been released from the mold assembly.

Figure 4:
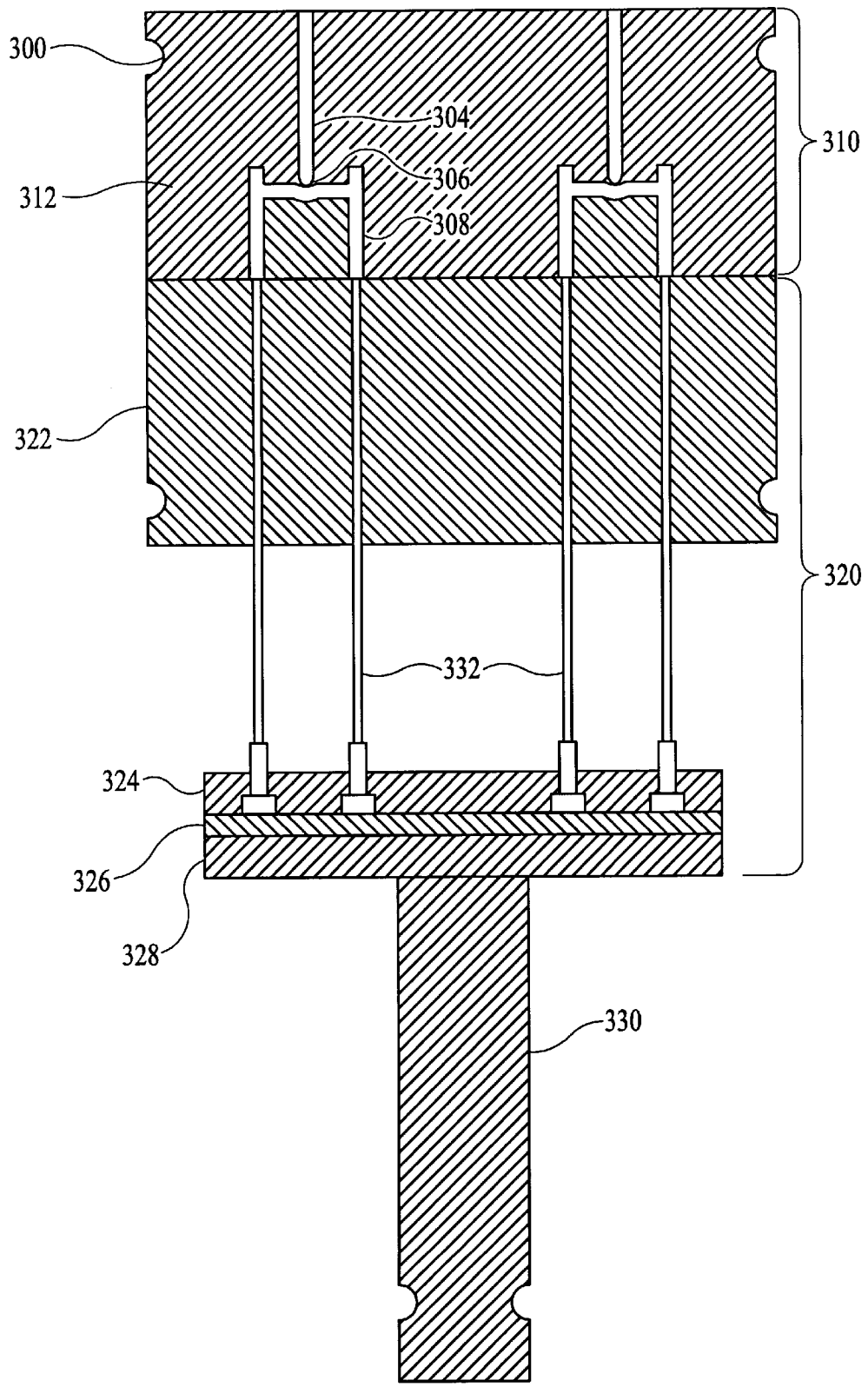
FIG. 4 is a side view of one interchangeable molding tool, in accordance with the present invention.

The illustrated embodiment of the present invention is capable of simultaneously molding eight different components. As shown in FIG. 4, the present invention includes interchangeable molding tools 300 which are custom made for molding a desired plastic component or other material-like component. Each molding tool can be customized to manufacture a desired part. Moreover the interchangeable molding tools 300 can be easily removed and replaced, if necessary, without the need of replacing an entire side of the mold assembly. The interchangeable molding tools 300 which releasably attach to the mold assembly of the present invention comprise a fixed tool side 310 and an ejector tool side 320. The fixed tool side 310 of the interchangeable molding tool 300 comprises a runner tool distribution system 312. The ejector tool side 320 of the interchangeable molding tool 300 comprises an ejector tool plate 322, an ejector tool retainer plate 324, an ejector tool back-up plate 326, an ejector tool pusher retainer plate 328, a tool pusher bar 330 and at least one ejector pin 332 substantially affixed to the ejector retainer tool back-up plate 326 and extending through the ejector tool retainer plate 324.

Figure 3:
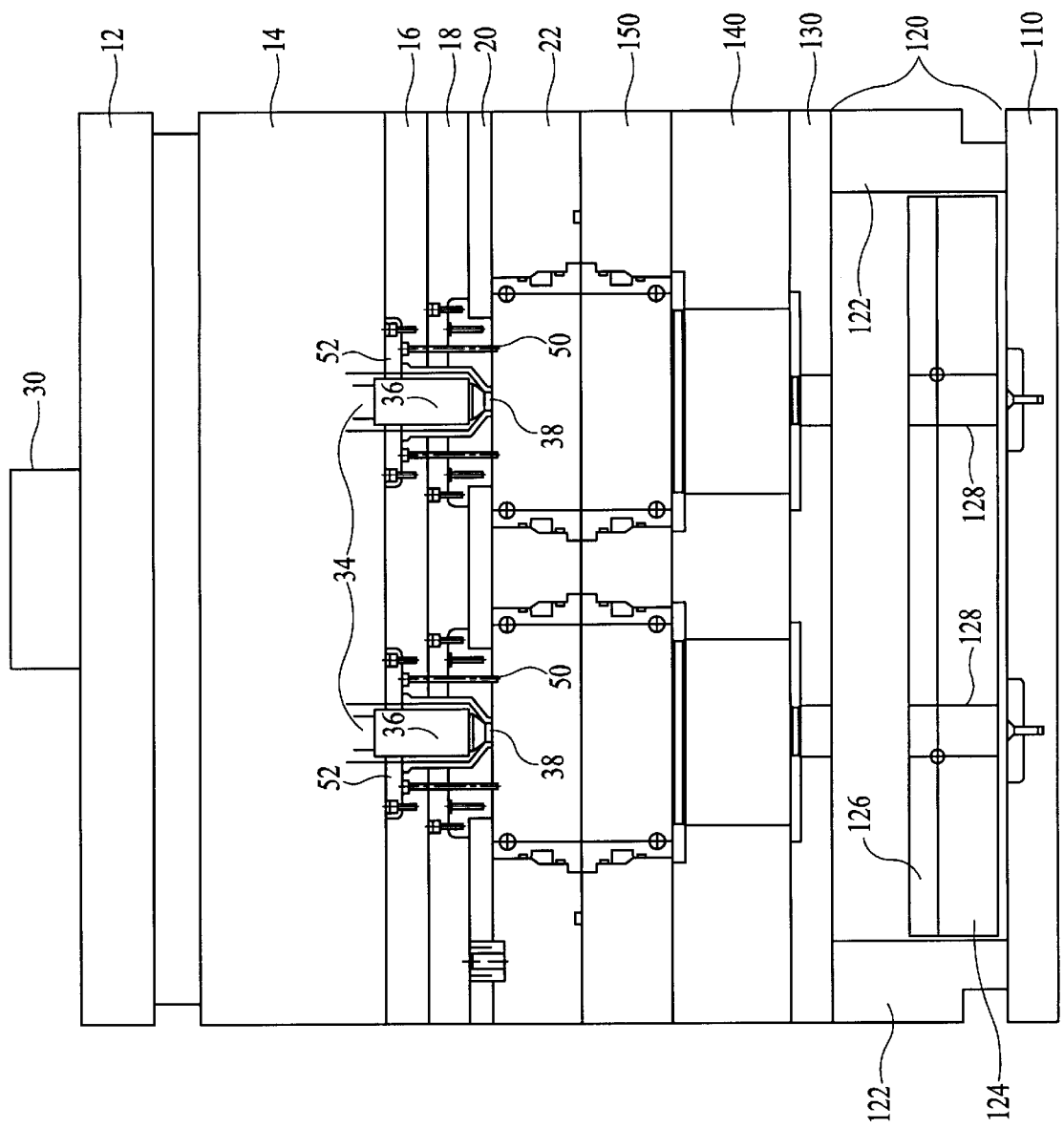
FIG. 3 is a sectional view taken generally transversely through the closed mold sides, to illustrate the manner in which the removable interchangeable molding tools are assembled therein.

As shown in FIGS. 3 and 4, the present invention is designed to allow for the gating of a component directly into the tool, known as center gating, to allow the formation of a completely concentric part between the inside and outside of the diameter of the circular part. Center gating reduces the well lines formed when molding a circular part because the uniform flow of a molded material from the center of a round part produces a stronger part, as the molding material uniformly molds from the center of the part radially outwards. The use of edge gating for the molding of a circular part creates a weaker part, as it results in an unequal stress distribution between the initial point of contact, where the molding material first enters the part, and the last point of contact where the molding material completes the part. Therefore, because geometry of a desired part dictates how it should be gated, circular parts that require the ability to withstand equal stress uniformly around the center of the circular part are best molded if the molding material enters through to the center of the part, and then molds radially outwards from the center of the part. Center gating is best utilized for the formation of gear-type parts and other round or cylindrical parts. Center gating is achieved by using a runner tool distribution system 312 substantially located within the interchangeable fixed tool side 310 of the interchangeable molding tool 300. For example, the illustrated embodiment shown in FIG. 4 shows an interchangeable molding tool 300 further comprising a runner tool distribution system 312 comprising a plurality of gates 304 which lead directly to the center point 306 of the circular part to be molded 308.

Additionally, a plurality of conventional removable runner inserts (not shown) can be used within the runner tool distribution system to be replaced when using a highly abrasive molding material such as glass filled material.

Figure 2:
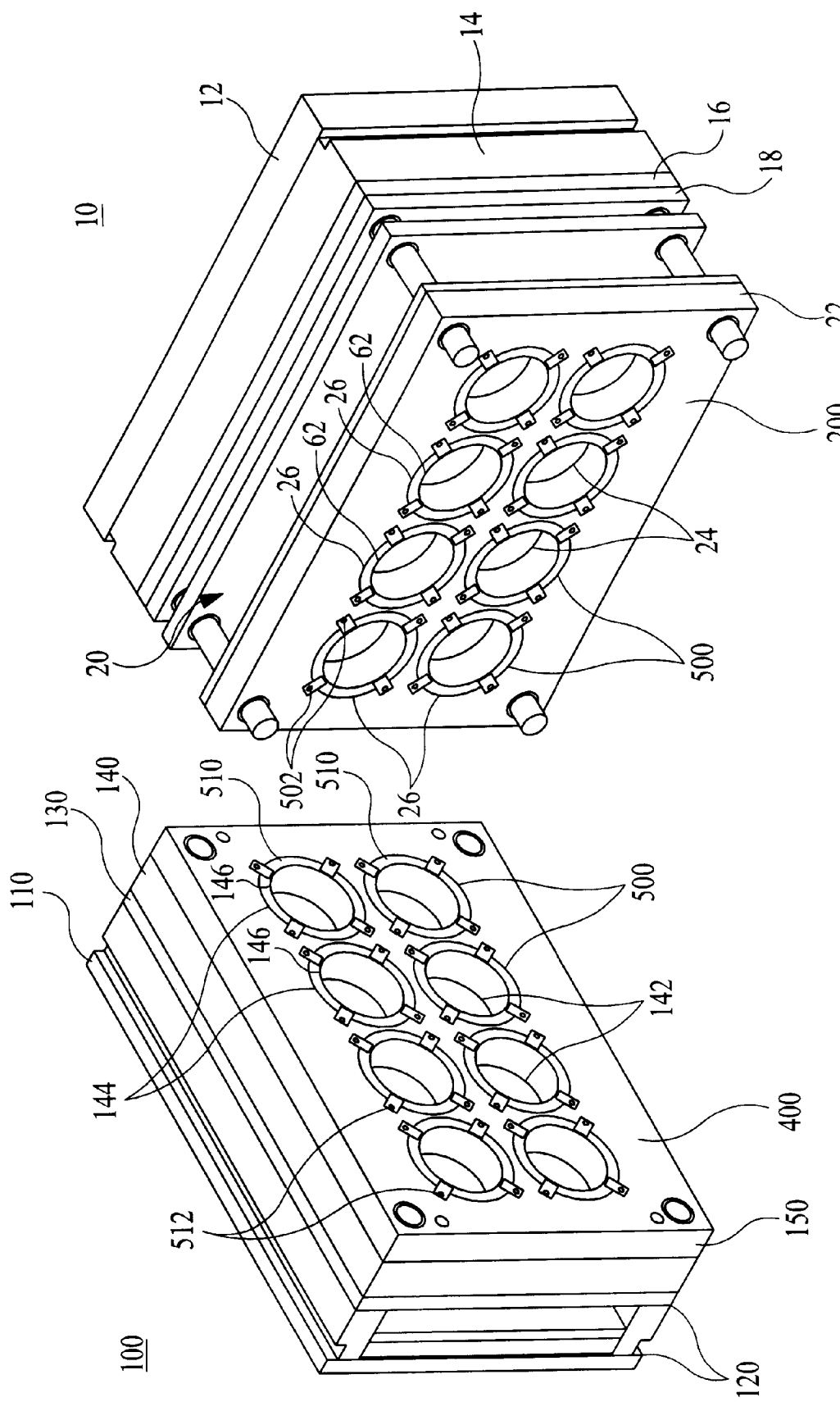
FIG. 2 is an enlarged perspective view of the mold assembly, the fixed side having a fixed molding surface and the ejector side having an ejector molding surface, in accordance with the present invention.

The fixed side of the injection molding press apparatus 10, shown in FIGS. 1 and 2, comprises a top clamp plate 12, a manifold plate 14, a first fixed back-up plate 16, a stripper plate, 18, a second fixed back-up plate 20, a fixed plate 22 and a plurality of sucker pins 50 substantially attached to the first fixed back-up plate 16. The molding surface 200 of the fixed side 10 of the mold assembly comprises a plurality of fixed mold cavities 24 for insertion of each fixed tool side 310 of each interchangeable molding tool 300, each fixed tool side 310 of the interchangeable molding tools 300 having a size smaller than each fixed mold cavity 24 and each fixed mold cavity 24 having an outside fixed mold cavity perimeter 26. The fixed side 10 of the mold assembly further comprises a plurality of sucker pin retainer plates 52 substantially affixed to the first fixed back-up plate 16 and a plurality of sucker pins 50 substantially affixed to the sucker pin retainer plates 52 and extending through the stripper plate 18 and the second fixed-back up plate 20.

The ejector side of the present invention 100, shown in FIGS. 1 and 2, comprises a plurality of movable plates, including a bottom clamp plate 110, an ejector box assembly 120, a first ejector support plate 130, a second ejector support plate 140 and an ejector plate 150. The ejector box assembly 120 comprises a plurality of ejector rails 122, an ejector box plate 124, and an ejector retainer plate 126 and a push rod 128 substantially affixed to the ejector box plate 124 and extending through the ejector retainer plate 126. The ejector molding surface 400 of the ejector side of the mold assembly (best shown in FIG. 2) comprises a plurality of ejector mold cavities 142 for insertion of each ejector tool side 320 of each interchangeable molding tool 300, each ejector tool side 320 having a size smaller than each ejector mold cavity 142 and each ejector mold cavity 142 having an outside ejector mold cavity perimeter 144.

The securing means for securing the interchangeable molding tools 300 to the mold assembly comprises a plurality of fixed keys (not shown) which releasably secure each fixed tool side 310 of the interchangeable molding tools 300 to the fixed side 10 of the mold assembly, the fixed molding surface 200 of the mold assembly having a plurality of fixed key holes 502 (shown in FIG. 2) located substantially adjacent to each outside fixed mold cavity perimeter 26 of each fixed mold cavity 24, and a plurality of ejector keys (not shown) which releasably secure each ejector tool side 520 of each interchangeable molding tool 500 to the ejector side 500 of the mold assembly, the ejector molding surface 400 of the mold assembly having a plurality of ejector key holes 512 (show in FIG. 3) located substantially adjacent to the outside ejector mold cavity perimeter 144 of each ejector mold cavity 142.

The locking means for locking the mold assembly when the molding material surfaces 200, 400 are pressed together to from the mold cavities, 22, 142 comprises a locking apparatus.

The means for injecting a molding material into the plurality of mold cavities is best shown in FIG. 3. The means for injecting a molding material into the mold assembly for forming a plurality of different components comprises the top clamp plate 12 of the fixed side of the mold assembly having a receiving inlet 30 for injection of the molding material by a conventional injection apparatus (not shown), a plurality of interior molding channels 34 for the travel of the molding material from the receiving inlet 30 into a conventional hot manifold system (not shown), and then into a plurality of injection nozzles 36, each injection nozzle 36 having an exit injection nozzle 38, wherein the molding material once it is injected into the receiving inlet 30 travels to the injection nozzles 36 until the molding material is released by each injection exit nozzle 38 into the runner tool distribution system 312 located within the fixed tool side 310 of each interchangeable molding 300 tool. Once the molding material is released by the injection exit nozzle 38 into the runner tool distribution system 312 which is substantially centrally located within the fixed tool side 310 of each interchangeable molding tool 310, when the molding surfaces 200, 400 are pressed together, the molding material is distributed through the runner tool distribution system 312 to each fixed mold cavity 24 and each ejector mold cavity 142 to form the plurality of different parts 308.

The cooling means for cooling the different molded components once the molded material is injected into the mold assembly comprises a water jacket apparatus.

Because the present invention allows for the center gating of a part, once the molding material has set, it is necessary to separate each runner 302, the excess mold formed in each runner tool distribution system 312, from the molded part 308, as the runner distribution system is directly located within the fixed tool side 310 of each interchangeable molding tool 300. This is accomplished by a stripping means. Once the injection material has set, the first fixed back-up plate 16 and the stripper plate 18 of the fixed side 310 of the mold assembly pull back or retract a sufficient distance away from the second fixed back-up plate 20, breaking the gate 304 from the molded part. As the stripper plate 18 pulls away from the second back-up plate 20, the sucker pins 50 which are substantially affixed to the first fixed back-up plate 16 hook onto the runner 302 which cause the runner 302 to retract with the stripper plate 18, thereby breaking the gate 304 and hence the runner 302 away from the molded part 308. Once the runner 302 is stripped from the molded component 308 by way of the sucker pins 50, a first removal means is used to remove each runner 302 from the stripper plate 18 by either a robotic means or by simply allowing the runner 302 to drop down into a grinding machine for reuse.

The means for simultaneously releasing the different molded components once the molding material has set and the runner 302 has been removed from the mold assembly, comprises the use of a conventional ejection assembly, which causes the simultaneous ejection of the different molded components. As shown in FIGS. 3 and 4, the ejector side 100 of the mold assembly comprises a conventional ejector box assembly 120 comprising a plurality of ejector rails 122, an ejector box plate 124, an ejector retainer plate 126, and a push rod 128 substantially affixed to the ejector box plate 124 and extending through the ejector retainer plate 126. A hydraulic system (not shown) activates the ejector plate 124 to move vertically upwards causing the ejector retainer plate 126 and hence the push rod 128 to vertically push upwards and abut the first ejector support plate 130 thereby pushing the tool pusher bar 330 into the ejector tool pusher retainer plate 328 and ejector tool back-up plate 326, causing the ejector pins 332 which are substantially affixed to the ejector tool back-up plate 326 to move vertically upwards through the ejector tool side 320 of the interchangeable molding tool 300 causing the different molded components to simultaneously eject outwards, releasing the different molded components from the ejector side 100 of the mold assembly. A robotic arm avoiding the need to separate the plurality of different parts then removes the released different components.

Having described the invention in detail, those skilled in the art will appreciate that modifications may be made of the invention without departing from its spirit. Therefore, it is not intended that the scope of the invention be limited to the specific embodiment illustrated and described. Rather it is intended that the scope of the invention be determined by the appended claims and their equivalents.

We claim:

1. An injection molding press apparatus comprising:

a mold assembly comprising a fixed side and an ejection side which sides when pressed together form- a plurality of mold cavities, said fixed side of said mold assembly comprising a top clamp plate, a manifold plate, a first fixed back-up plate, a stripper plate, a second fixed back-up plate and a fixed plate, said ejector side of said mold assembly comprising a bottom clamp plate, an ejector box assembly comprising a plurality of ejector rails, an ejector box plate and an ejector retainer plate, a first ejector support plate, a second ejector support plate and an ejector plate, wherein said fixed side further comprises a plurality of sucker pin retainer plates substantially affixed to said first fixed back-up plate and a plurality of sucker pins substantially affixed to said sucker retainer plates, said plurality of sucker pins extending through said stripper plate and said second fixed back-up plate;

a plurality of interchangeable molding tools attached to said mold assembly for molding a plurality of different components, each interchangeable molding tool comprising a fixed tool side having a runner tool distribution system and all ejector tool side having an ejector tool plate, an ejector tool back-up plate, a tool pusher retainer, plate, a pusher tool bar and a plurality of ejector pins substantially affixed to said ejector tool retainer plate extending through said ejector tool retainer plate, wherein said fixed side of said mold assembly comprises a fixed molding surface having a plurality of fixed mold cavities for insertion of each fixed tool side of said interchangeable molding tools, said fixed tool side of each interchangeable molding tool having a size smaller than each fixed mold cavity, each fixed mold cavity having an outside fixed mold cavity perimeter.

wherein said ejector side of said mold assembly comprises an ejector molding surface having a plurality of ejector mold cavities for insertion of each ejector tool side of said interchangeable molding tools, each ejector tool side of each interchangeable molding tool having a size small than each ejector mold cavity, each ejector mold cavity having an outside ejector mold cavity perimeter;

a securing means for securing said interchangeable molding tools to said mold assembly comprising a plurality of fixed locking keys which releasably lock said fixed tool side of said interchangeable molding tools to said fixed side of said mold assembly, said fixed molding surface having a plurality of fixed locking key holes located substantially adjacent to each outside fixed mold cavity perimeter, and a plurality of ejector rotating locking keys which releasably lock said ejector tool side of said interchangeable molding tools to said ejector side of said mold assembly, said ejector molding surface having a plurality of ejector locking key holes located substantially adjacent to each outside ejector mold cavity perimeter;

a locking means for locking said mold assembly when said molding surfaces are pressed together to form said mold cavity comprising a locking apparatus;

a means for injecting a molding material directly into said interchangeable molding tool for forming said plurality of different components comprises said top clamp plate of said fixed side having a receiving aperture for injection of said molding material by a conventional injection apparatus, a plurality of injection channels, a hot manifold system, and a plurality of injection exit nozzles, wherein said molding material once injected into said receiving aperture of said top clamp plate travels through said injection channels into said hot manifold system until said molding material is released by said injection exit nozzles into each runner tool distribution system located within each fixed tool side of each interchangeable molding tool;

a plurality of runner tool distribution systems, each runner tool distribution system forming a runner when said injection material has set;

a cooling means for cooling said plurality of different components comprising a water jacket apparatus for injection molding systems;

a stripping means for separating each runner from each molded component once said molding material has set, comprising the separation of said stripper plate from said second fixed back-up plate, wherein said sucker pins which are releasably attached to said stripper plates releasably affix to said runners and retract away from said fixed plate causing each runner to break away from each molded component;

a first removal means for removing said runners from said mold assembly; and a releasing means for releasing said plurality of different components once said molding material has set comprises robotic removal of said runners.

* * * * *